United States Patent [19]

Junttila

[11] Patent Number: 4,533,086

[45] Date of Patent: Aug. 6, 1985

[54] PROCESS FOR GRINDING GRAPHITE

[75] Inventor: Jack D. Junttila, Country Club Hills, Ill.

[73] Assignee: Atlantic Richfield Company, Philadelphia, Pa.

[21] Appl. No.: 453,071

[22] Filed: Dec. 27, 1982

[51] Int. Cl.³ .................... B02C 23/18; B02C 23/36
[52] U.S. Cl. .......................... 241/16; 241/20; 241/21; 241/24; 423/448; 423/460; 423/461; 209/5
[58] Field of Search ............... 241/16, 21, 20, 22, 241/24, 26, 30, 170; 209/5; 423/448, 460, 461, 463

[56] References Cited

U.S. PATENT DOCUMENTS 3,677,476 7/1972 Harned ..................... 241/21
4,248,697 2/1981 Halvorsen .................. 209/5

OTHER PUBLICATIONS

Metallurgical & Petroleum Engineers, Inc., *Agglomeration* 77 vol. 2, K.V.S. Sastry, Ed., Am. Inst. of Mining, 1977 (Chs. 54–56, pp. 910–951).

*Primary Examiner*—Howard N. Goldberg
*Assistant Examiner*—Timothy V. Eley
*Attorney, Agent, or Firm*—John B. Goodman

[57] ABSTRACT

Disclosed is a process for grinding graphite comprising:
(1) forming a mixture of graphite and a graphite grinding aid;
(2) grinding the mixture of graphite and graphite grinding aid to reduce the size of the graphite;
(3) forming an aqueous slurry of the graphite particles, graphite grinding aid and water;
(4) adding an amount of hydrocarbon oil to the aqueous slurry with agitation to form graphite-oil agglomerates;
(5) separating the graphite-oil agglomerates from the grinding aid and water; and
(6) removing hydrocarbon oil from the graphite-oil agglomerates to provide graphite particles reduced in size.

11 Claims, No Drawings

4,533,086

PROCESS FOR GRINDING GRAPHITE

BACKGROUND OF THE INVENTION

1. Field of the Invention

The field of this invention relates to grinding graphite.

2. Prior Art

Graphite is a form of elemental carbon crystallized predominantly in the hexagonal system. Silicate mineral impurities varying in kind and percentage are usually associated with graphite in the ore.

The uses of natural graphite are dependent upon its physical and chemical properties. It is unctuous, which accounts for its demand as a dry lubricant and which, combined with its high electrical conductivity, makes it useful for motor and generator brushes. It is soluble in molten iron and, therefore, is used to raise the carbon content of steel. Its largest single use probably still is for foundry facings, where it prevents metals and alloys from sticking to the molds. Graphite is unequaled for many refractory uses, including crucibles, because of its high heat conductivity, its slow burning property and its ability to retain good strength at high temperatures. It is probably best known, however, for its use in such products as pencils, batteries, paints and inks, and brake linings.

Natural graphite is sold in several different grades. Low grade (low purity) graphite has several substantial uses.

For example, foundry facings have accounted for nearly 20 percent of the total consumption in the past years. Low quality and amorphous graphite is suitable for this use. The graphite is mixed with a small amount of clay, suspended in an adhesive material and applied as thin coatings to mold surfaces to provide for clean and easy recovery of the metal castings.

Another large user of low quality graphite is the steel industry. The graphite is added to steel melts to increase the carbon content to the desired level.

Other uses of graphite require that the graphite have very high purity. High purity natural graphite is required, for example, when the graphite is employed in lubricants or in forming high temperature refractory crucibles. These high purity (premium grade) natural graphites are substantially more valuable than low grade graphite. Flake graphite from disseminated deposits must be concentrated to meet market requirements. Virtually every known concentrating device and combination of separating principles has been tried in an effort to upgrade or purify natural graphite. The mineral has gained a reputation of being difficult to concentrate and upgrade.

Generally, processes for purifying involve an initial step of grinding the graphite to liberate mineral matter. Even this initial step, however, is difficult because the inherent lubricity of graphite makes grinding graphite difficult.

In addition, many uses of graphite require that the graphite be ground to a fine particle size. Graphite lubricants generally require fine size graphite particles. Foundry facings are thin coatings of graphite particles mixed with adhesive material. In pencils and batteries, graphite artifacts are employed which are formed from fine graphite particles and a binder to provide desired shapes and physical characteristics. In short, in many applications, there is a need to grind graphite to provide graphite particles reduced in size.

While a variety of mechanical methods have been employed heretofore for grinding graphite, there is a clear need for a more effective and efficient process for grinding graphite.

SUMMARY OF THE INVENTION

In summary, this invention presents a process for grinding graphite comprising:
(1) forming a mixture of graphite and a graphite grinding aid;
(2) grinding the mixture of graphite and graphite grinding aid to provide graphite particles reduced in size;
(3) forming an aqueous slurry of the graphite particles, graphite grinding aid and water;
(4) adding an amount of hydrocarbon oil to the aqueous slurry with agitation to form graphite-oil agglomerates;
(5) separating the graphite-oil agglomerates from the grinding aid and water; and
(6) removing hydrocarbon oil from the graphite-oil agglomerates to provide graphite particles reduced in size.

DETAILED DESCRIPTION OF THE INVENTION AND ITS PREFERRED EMBODIMENTS

In its broad aspect, this invention presents a process for grinding graphite comprising:
(1) forming a mixture of graphite and a graphite grinding aid;
(2) provide graphite particles reduced in size;
(3) forming an aqueous slurry of the graphite particles, graphite grinding aid and water;
(4) adding an amount of hydrocarbon oil to the aqueous slurry with agitation to form graphite-oil agglomerates;
(5) separating the graphite-oil agglomerates from the grinding aid and water; and
(6) removing hydrocarbon oil from the graphite-oil agglomerates to provide graphite particles reduced in size.

Graphites which can be employed in the process of the invention include amorphous, flake and crystalline natural graphite, and synthetic graphite. An especially preferred graphite for use in this invention is the natural flake graphite from Senja Island in Norway.

A feature of the process of this invention is the discovery that certain materials can accelerate or otherwise aid the grinding of graphite. These materials which can accelerate or otherwise aid the grinding of graphite are designated herein as "graphite grinding aids."

Suitable graphite grinding aids are materials which have a hardness greater than graphite.

Generally, graphite has a Mohs hardness of from about 0.5 to 1.5.

Suitable grinding aids will generally be materials with a Mohs hardness of 2 or greater. Preferred grinding aids will have a Mohs hardness greater than 3, and more preferably greater than 6. Representative examples of materials which are suitable grinding aids are the following:

| Grinding Aid | Mohs Hardness |
|---|---|
| gypsum | 2 |
| calcite | 3 |

| Grinding Aid | Mohs Hardness |
| --- | --- |
| fluorite | 4 |
| apatite | 5 |
| feldspar | 6 |
| quartz | 7 |
| topaz | 8 |
| corundum | 9 |
| aluminum oxide | 9 |
| silicon carbide | 9.50 |
| boron carbide | 9.75 |
| boron nitride | 10 |

A preferred grinding aid, because of its low cost and ready availability, is sand. Another preferred grinding aid includes the mineral tailings from the cleaning of natural graphite.

Preferably, the graphite grinding aid will have a mean particle size no greater than ten, more preferably no greater than 5 times the particle size of the desired ground graphite product.

The graphite grinding aid is added to graphite to form a mixture of graphite and graphite grinding aid.

Small amounts of graphite grinding aid will aid the grinding of graphite. Especially suitable mixtures of graphite and graphite grinding aid can contain about 100 parts graphite and from about 2 parts to about 40 parts graphite grinding aid. Preferred mixtures of graphite and graphite grinding aid contain about 100 parts graphite and from about 5 parts to 30 parts graphite grinding aid.

The mixture of graphite and graphite grinding aid is then ground to reduce the size of the graphite. Grinding the mixture of graphite and graphite grinding aid can be done employing conventional devices such as ball mills, rod mills and the like.

After grinding, the graphite and graphite grinding aid are separated.

While it is not necessarily the case, the graphite that it is desired to grind and reduce in size will generally be graphite containing mineral matter. In seperating the graphite aid in the subsequent steps of the process of this invention, mineral matter will also be separated. As a consequence, if graphite containing mineral matter is employed in the process of this invention, it will be upgraded in that the recovered graphite will not only have a reduced particle size, but will be reduced in mineral matter.

To separate the graphite and graphite grinding aid, an aqueous slurry of the ground graphite, graphite grinding aid, liberated mineral matter, if any, and water is formed. Preferably, the aqueous slurry will contain from about 95% to about 50%, more preferably from about 95% to about 80%, by weight of the aqueous slurry, of water.

In one aspect of this invention, the ground graphite particles, graphite grinding aid and mineral matter, if any, can optionally be contacted with a conditioning agent to aid in separating the graphite grinding aid and other mineral matter from the graphite.

Conditioning agents found especially useful herein include ferrous iron compounds which exhibit some degree of solubility under the conditions of use. Among such conditioning agents are ferrous iron compounds which can hydrolyze in water and the hydrolyzed forms of such ferrous iron compounds, preferably such forms which exist in effective amounts under the conditions of use. Proper pH and temperature conditions are necessary for some ferrous compounds to exist in an effective form. The ferrous iron compounds, both those having substantial solubility in water and those which are hydrolyzed or exist in hydrolyzed form under the given conditions of contacting (i.e., temperature and pH), modify or alter the existing surface characteristics of mineral matter, presumably increasing the hydrophilic nature of such surfaces. Preferred salts include, for example, ferrous sulfate, nitrate, chloride, hydroxide, and acetate. The ferrous iron conditioning agents of this invention are employed at a pH maintained within the range from about 5.5 to about 11.0, and preferably maintained within the range from about 6.0 to about 9.0, and more preferably within the range of from about 6.0 to 8.0. More preferably, the pH is substantially neutral. Substantially neutral conditions may be conveniently maintained by the inclusion of finely divided limestone or a similar alkaline earth carbonate in the system to react with any acidic components released from the mineral matter during the processing operations. For example, one preferred conditioning agent comprises a suspension of finely divided calcium carbonate in an aqueous solution of ferrous sulfate. Carbonates of magnesium, strontium and barium may also be employed.

The mixture of graphite and graphite grinding aid are preferably contacted with conditioning agent in an aqueous medium by forming a mixture of the graphite particles, graphite grinding aid, conditioning agent, limestone and water. The mixture can be formed, for example, by grinding graphite with graphite grinding aid in the presence of limestone and water, and adding a suitable amount of conditioning agent. Another very suitable contacting method involves forming an aqueous mix of conditioning agent, water, limestone and graphite and then crushing the graphite with graphite grinding aid and limestone with the aqueous mix of conditioning agent, for example, in a ball mill, to particles of a suitable size.

An amount of conditioning agent is employed which is sufficient to promote the separation of graphite grinding aid and other mineral matter from the graphite. Generally, the proportion of conditioning agent, based on graphite, will be within the range from about 0.01 to about 10 wt. %, desirably within the range from about 0.02 to about 2 wt. %, and often within the range from about 0.05 to about 0.25 wt. %.

An amount of hydrocarbon oil necessary to form graphite-oil agglomerates is then added to the aqueous slurry.

Graphite-hydrocarbon oil agglomerates are readily formed by agitating the aqueous slurry containing the mixture of graphite, graphite grinding aid and hydrocarbon oil. In the process of this invention, it is preferred to add the hydrocarbon oil to the aqueous medium of graphite particles and conditioning agent, if present, and agitate the resulting mixture to agglomerate the graphite particles. If necessary, the water content of the mixture can be adjusted to provide for optimum agglomerating. Generally, from about 50 to about 95 parts water, and more preferably 70 to about 90 parts water, based on the weight of the aqueous slurry, is most suitable for agglomeration. There should be sufficient hydrocarbon oil present to agglomerate the graphite particles. The optimum amount of hydrocarbon oil will depend upon the particular hydrocarbon oil employed, the size of the graphite particles and the size of agglomerate desired. Generally, the amount of hydrocarbon oil contained in the graphite-oil agglomerate will generally be from about 1% to about 40%, by weight, and more preferably about 3% to 30%, by weight.

Suitable hydrocarbon oils for forming the graphite-oil agglomerates are derived from petroleum, shale oil, tar sand and coal. Especially suitable hydrocarbon oils are light and heavy refined petroleum fractions such as naphtha, light cycle oil, heavy cycle oil, heavy gas oil, clarified oil, kerosene, heavy vacuum gas oil, residual oil, coal tar and other coal derived oils. Mixtures of various hydrocarbon oils can be quite suitable, particularly when one of the materials is very viscous.

The hydrocarbon oils employed in this invention are hydrophobic and will preferentially wet hydrophobic material, i.e., graphite. While not wishing to be bound by any particular theory, it is theorized that the conditioning agents can aid by altering or modifying mineral matter (e.g., the graphite grinding aid and/or mineral matter associated with the graphite) by associating with the mineral matter to impart to hydrophilic characteristics, thereby enhancing the separation of the mineral matter, e.g., graphite grinding aid, from the graphite by enhancing preferential agglomeration of the graphite (and not the mineral matter) with hydrocarbon oil.

When the mixture of water, hydrocarbon oil, graphite particles and graphite grinding aid is agitated, the hydrocarbon oil preferentially wets (becomes associated with) the graphite particles, as opposed to the graphite grinding aid. These hydrocarbon wet particles collide with one another under suitable agitation forming graphite-oil agglomerates substantially larger than the graphite grinding aid particles.

Agitating the mixture of water, hydrocarbon oil and graphite particles to form graphite-oil agglomerates can be suitably accomplished using stirred tanks, ball mills or other apparatus.

The resulting graphite-oil agglomerates can be separated from the mineral matter using a variety of separation techniques.

Preferably, a separation is effected by taking advantage of the size difference between graphite-oil agglomerates and unagglomerated graphite grinding aid. For example, the graphite-oil agglomerates can be separated from the water and graphite grinding aid by filtering with bar sieves or screens which predominately retain the graphite-oil agglomerates, but pass water and unagglomerated graphite grinding aid. The result is a physical separation of the graphite grinding aid from graphite. When this technique is employed, graphite-oil agglomerates of a size suitable for ready filtering must be formed.

Graphite-oil agglomerates can also be desirably separated by taking advantage of the different surface characteristics and/or density of the graphite-oil agglomerates and graphite grinding aid, for example, employing flotation, skimming techniques or hydroclones.

The oil can be removed from these graphite-hydrocarbon oil agglomerates to provide graphite particles reduced in size. A variety of methods can be employed to remove the hydrocarbon oil from the recovered graphite-hydrocarbon oil agglomerates. For example, the recovered graphite-hydrocarbon oil agglomerates can be washed with an organic solvent such as hexane, toluene or acetone in which the hydrocarbon oil is soluble. The resulting solution is then separated from the graphite particles, for example, by filtering, and the graphite particles are dried, for example, with warm air or inert gas, to provide graphite reduced in size.

The following example is provided to illustrate a specific embodiment of the invention described herein.

EXAMPLE

A portion of graphite having a purity of 96% was divided into two portions to provide a feed graphite for Run 1 and Run 2 below. A particle size analysis of the feed graphite is presented in Table I below.

Run 1 (No graphite grinding aid)

A total of 100 grams of feed graphite, having a purity of 96%, along with 400 grams of water, were put into a 2 liter ball mill. Grinding was then performed in the ball mill at 72 RPM and for 1 hour. Three quarter-inch stainless steel balls were used for grinding media. After grinding, the slurry was dumped on a 6 mesh screen to separate the balls and the balls and ball mill rinsed. The slurry was then screened to provide fractions for particle size analysis. The various fractions were then dried and weighed. The results of the particle size analysis are presented in Table I below.

Run 2 (With grinding graphite aid)

Ninety grams of feed graphite, having a purity of 96%, 10 grams of sea sand, a graphite grinding aid of this invention, and 400 grams of water were put into a 2 liter ball mill. Grinding was then performed in the ball mill at 72 RPM for 1 hour using identical energy input as in Run 1. Three quarter-inch stainless steel balls were used for grinding media. After grinding, the slurry was dumped on a 6 mesh screen to separate the balls and the balls and ball mill rinsed.

The slurry was then poured into a blender and agitated with light cycle oil to form graphite-oil agglomerates. The slurry was then screened on a 70 mesh screen. The graphite-oil agglomerates were retained on the screen and the water and graphite grinding aid passed through the screen. The graphite-oil agglomerates were recovered, slurried with four times their weight in acetone, and filtered to provide a ground deoiled graphite product reduced in size. This product was then slurried in water and screened to provide fractions for particle size analysis. The various fractions were then dried and weighed. The results of the particle size analysis are presented in Table I below.

The graphite product reduced in size from Run 2 was 98.8% pure.

TABLE I

| Graphite Grinding Runs | | | | | |
|---|---|---|---|---|---|
| Feed Graphite | | Run 1 No Graphite Grinding Aid | | Run 2 With Graphite Grinding Aid | |
| Wt. % Smaller Than | Microns | Wt. % Smaller Than | Microns | Wt. % Smaller Than | Microns |
|  |  | 0.60 | 7.67 | 0.75 | 7.67 |
|  |  | 2.80 | 31.7 | 3.75 | 30.9 |
|  |  | 5.03 | 74.8 | 6.75 | 74.6 |
| 1.11 | 75. | 5.59 | 75. | 7.50 | 75. |
| 5.47 | 150. | 14.84 | 150. | 26.73 | 150. |
| 22.49 | 212. | 34.01 | 212. | 55.47 | 212. |
| 78.87 | 300. | 78.76 | 300. | 91.36 | 300. |
| 100.0 | 1000. | 100.00 | 100. | 100.00 | 1000. |

Run 1 is not an example of the invention, but is a comparison run provided to demonstrate the advantage of the invention. Run 2 is an example of the invention. The data illustrates the advantage obtained by employing the process of the invention.

The data in Table I shows that, even though Run 2 started with 10 grams less graphite that Run 1 containing no graphite grinding aid, it still had more graphite on a weight basis of particles 300 microns or smaller (passes through a 50 mesh screen). For example; for Run 1, 78.76% of the product passes through a 50 mesh screen, this is the equivalent of 78.76 grams of graphite. Whereas, for Run 2, 91.36% of the product passes through a 50 mesh screen, this is the equivalent of 82.22 grams of graphite, assuming no material losses and perfect separation of the graphite grinding aid and graphite.

As can be seen, the process of this invention, as illustrated by Run 2, provides a graphite product substantially reduced in particle size. In addition, the graphite product was enhanced in purity.

Unless otherwise stated, all parts and percentages herein are on a weight basis.

What is claimed is:

1. A process for grinding graphite comprising:
   (1) forming a mixture of graphite and a graphite grinding aid;
   (2) grinding the mixture of graphite and graphite grinding aid to reduce the size of the graphite;
   (3) forming an aqueous slurry of the graphite particles, graphite grinding aid and water;
   (4) adding an amount of hydrocarbon oil to the aqueous slurry with agitation to form graphite-oil agglomerates;
   (5) separating the graphite-oil agglomerates from the grinding aid and water; and
   (6) removing hydrocarbon oil from the graphite-oil agglomerates to provide graphite particles reduced in size.

2. The process of claim 1 wherein the mixture of a graphite and graphite grinding aid comprise from about 100 parts graphite and from about 2 to 40 parts, by weight, graphite grinding aid.

3. The process of claim 2 wherein the graphite grinding aid has a Mohs hardness greater than 6.

4. The process of claim 1 wherein the aqueous slurry contains from about 5% to about 50%, by weight of the aqueous slurry, of graphite.

5. The process of claim 1 wherein the graphite grinding aid is selected from the group comprising sand, mineral matter liberated from graphite, and mixtures thereof.

6. The process of claim 1 wherein the hydrocarbon oil is derived from petroleum, shale, oil, tar sand and coal.

7. The process of claim 1 wherein the hydrocarbon oil is selected from the group consisting of light cycle oil, heavy cycle oil, heavy gas oil, clarified oil, kerosene, heavy vacuum gas oil, residual oil, coal tar, and mixtures thereof.

8. The process of claim 1 wherein the graphite-oil agglomerates contain from about 1% to about 25% oil.

9. The process of claim 1 wherein the graphite-oil agglomerates contain from about 15% to about 30% oil.

10. The process of claim 1 wherein the graphite grinding aid has a Mohs hardness greater than 3.

11. A process for grinding graphite comprising:
    (1) forming a mixture of graphite and a graphite grinding aid;
    (2) ball milling the mixture of graphite and graphite grinding aid to reduce the size of the graphite;
    (3) forming an aqueous slurry of the graphite particles, graphite grinding aid and water;
    (4) adding an amount of hydrocarbon oil to the aqueous slurry with agitation to form graphite-oil agglomerates;
    (5) separating the graphite-oil agglomerates from the grinding aid and water; and
    (6) removing hydrocarbon oil from the graphite-oil agglomerates to provide graphite particles reduced in size.

* * * * *